(12) United States Patent
Poston

(10) Patent No.: US 10,475,218 B2
(45) Date of Patent: Nov. 12, 2019

(54) GRAPH EXPANSION MINI-VIEW

(71) Applicant: BMC Software, Inc., Houston, TX (US)

(72) Inventor: Ricky L. Poston, Austin, TX (US)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 15/650,212

(22) Filed: Jul. 14, 2017

(65) Prior Publication Data

US 2017/0323464 A1   Nov. 9, 2017

Related U.S. Application Data

(63) Continuation of application No. 12/767,285, filed on Apr. 26, 2010, now Pat. No. 9,710,938.

(60) Provisional application No. 61/318,159, filed on Mar. 26, 2010.

(51) Int. Cl.
  *G06F 3/0482*   (2013.01)
  *G06F 3/0481*   (2013.01)
  *G06T 11/20*    (2006.01)

(52) U.S. Cl.
  CPC .......... *G06T 11/20* (2013.01); *G06F 3/0481* (2013.01); *G06F 3/0482* (2013.01); *G06F 3/04812* (2013.01)

(58) Field of Classification Search
  CPC .. G06F 3/0482; G06F 3/0481; G06F 3/04812; G06F 11/206
  See application file for complete search history.

(56) References Cited

U.S. PATENT DOCUMENTS

| | | |
|---|---|---|
| 5,745,718 A | 4/1998 | Cline et al. |
| 7,027,052 B1 | 4/2006 | Thorn et al. |
| 7,103,851 B1 | 9/2006 | Jaeger |
| 7,360,175 B2 | 4/2008 | Gardner et al. |
| 7,427,987 B2 | 9/2008 | Uthe |
| 9,710,938 B2 | 7/2017 | Poston |
| 2005/0076312 A1 | 4/2005 | Gardner et al. |
| 2006/0184892 A1 | 8/2006 | Morris |
| 2008/0016474 A1 | 1/2008 | Guido et al. |
| 2008/0270458 A1* | 10/2008 | Gvelesiani ........ G06F 17/30572 |
| 2010/0169832 A1 | 7/2010 | Chang |

OTHER PUBLICATIONS

Valle et al., "Mesh Topology Viewer (MTV): An SVG-Based Interactive Mesh Network Topology Visualization Tool", IEEE Symposium on Computers and Communications, Jul. 2008, 6 pages.

* cited by examiner

*Primary Examiner* — Matthew Salvucci

(74) *Attorney, Agent, or Firm* — Brake Hughes Bellermann LLP

(57) ABSTRACT

A graphical representation of a service model provides a full view of a portion of the graphical representation. A sub graph view may be displayed for nodes of the graphical representation of the service model that are associated with a selected node, including nodes that may not be visible in the full view. The sub graph view may be interactive, providing additional information regarding the nodes displayed in the sub graph view, and allowing making nodes in the sub graph view visible or invisible in the full view. Information may be displayed in the sub graph view about the status of the components being modeled by the service model corresponding to nodes displayed in the sub graph view.

21 Claims, 7 Drawing Sheets

GRAPH EXPANSION MINI-VIEW

CROSS REFERENCE TO RELATED APPLICATIONS

This application claims priority to U.S. application Ser. No. 12/767,285 entitled "Graph Expansion Mini View" filed Apr. 26, 2010, which claims priority to U.S. Provisional Application Ser. No. 61/318,159 entitled "Graph Expansion Mini View" filed Mar. 26, 2010 and which are incorporated by reference in their entirety herein.

BACKGROUND

This disclosure relates generally to the field of management of information technology (IT) services. More particularly, but not by way of limitation, it relates to a technique for improving usability of IT service models.

Business Service Management (BSM) is a methodology of viewing technology infrastructure administration and problem diagnosis from the perspective of its impact on critical business services rather than technology silos. One aspect of BSM involves the development of service models that model the IT services of the enterprise, with component elements of the service model representing business users, services, and IT infrastructure components that provide the services, such as software and hardware components.

On a high level, a service model is a collection of components that represent a business service. A business service can have one or more business processes. Each business process can contain several functional applications, each of which can have multiple IT components. A service model will contain the processes, show how the components are interconnected, and show how component failures propagate and impact the upstream services.

Service models in today's IT environment are typically complex, containing potentially thousands of underlying dependent services and IT components. The representation of these services and IT components is typically done using directed acyclic graphs (DAGs), where each component of the service model, whether a business user, a service component, or an IT infrastructure component, is represented as a node in the graph. For big service models, however, the visualization aspect may become challenging for the user. On one hand, complex user interface (UI) components can be used to provide as much data as possible about the service model elements so that all information is available to the user without requiring too much screen switching. On the other hand, the complexity of the service models makes it difficult to present the most important data given the limited screen display area that is available.

Furthermore, graphs of complex service models can be very large and difficult to navigate and view. Expansion and contraction of branches can be especially tedious. A user looking at a collapsed node may have no knowledge of the size or complexity of the branches underneath a collapsed node and must manually open the sub-branches one level at a time. If there is a large set of sub-nodes, this can take many actions across many scrolling pages of view.

SUMMARY

A method is disclosed herein where users can get a concise preview sub graph view of the content above or below an object. In addition, this preview is interactive in that they can open and close nodes from within this mini-view.

In one embodiment, a method is disclosed. The method comprises displaying, in a first window, a first portion of a plurality of nodes, each of the plurality of nodes representing a component modeled by a service model; determining that a cursor is positioned substantially coincident with a first target area associated with a first node of the first portion of the plurality of nodes; displaying, in a second window, the first node and a second portion of the plurality of nodes coupled to the first node, at least some of the second portion of the plurality of nodes invisible in the first window, responsive to the act of determining that a cursor is positioned substantially coincident with a first target area associated with a first node of the first portion of the plurality of nodes; and ceasing display of the second window upon determining that the cursor is positioned outside of the second window.

In another embodiment, a system is disclosed. The system comprises: a processor; a display, coupled to the processor; a user input device, coupled to the processor; a storage subsystem, coupled to the processor; and software stored on the storage subsystem, that when executed causes the processor to perform acts comprising: generating a graphical representation of a service model, comprising a plurality of nodes, each representing a component modeled by the service model; displaying in a first window on the display a first portion of the plurality of nodes; defining a first target area on the display associated with a first node of the plurality of nodes; and displaying in a second window on the display the first node and a second portion of the plurality of nodes coupled to the first node, the second portion of the plurality of nodes mutually exclusive with the first portion of the plurality of nodes, responsive to detecting that a cursor associated with the user input device is positioned with the first target area.

In yet another embodiment, a computer readable medium is disclosed. The computer readable medium has stored thereon instructions that cause a programmable control device to perform the method described above.

In yet another embodiment, a networked computer system is disclosed. The networked computer system comprises a plurality of computers communicatively coupled, at least one of the plurality of computers programmed to perform at least a portion of the method described above wherein the entire method described above is performed collectively by the plurality of computers.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts are understood to reference all instance of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

The graphical elements of the embodiments illustrated in the figures are illustrative and by way of example only. Service model graphs may use any convenient or desired technique known to the art for displaying elements of a graph.

Figure 1:
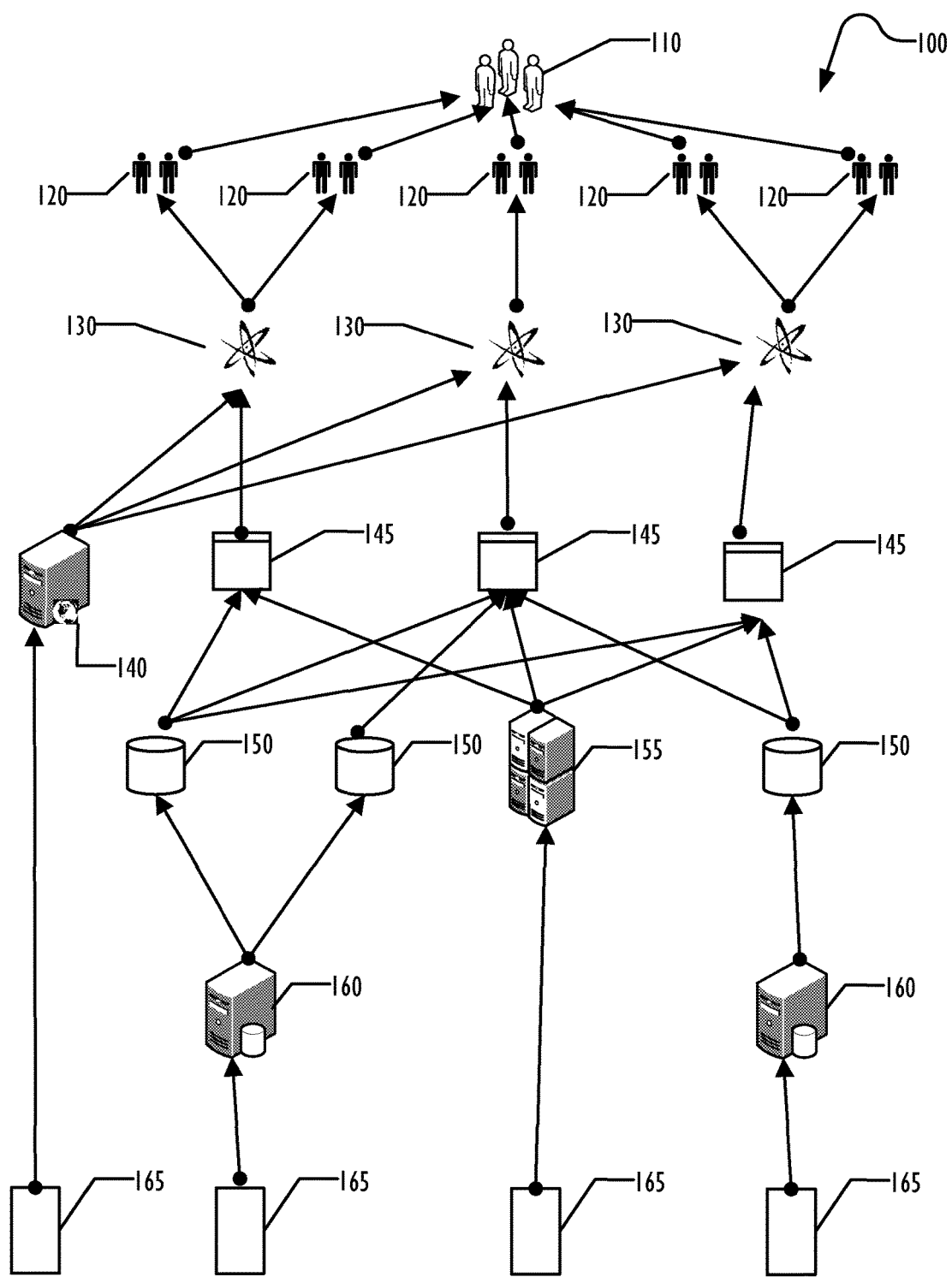
FIG. 1 illustrates, in graph form, an example of a service model graph according to the prior art.

FIG. 1 is an example of a generic service model graph 100 according to the prior art with business users, services, and IT structure layers. The lines between the component instances represent the provider/consumer relationships. In this example, the service model graph 100 represents an organization 110 with user groups 120, services 130, and numerous IT components, in this example including a web server 140, applications 145, databases 150, an application server 155, database servers 160, and workstations 165. In actual service models, the service model graph 100 may include thousands or tens of thousands of elements, and a full-sized view of the service model graph 100 may be collapsible so that a single visible node in the service model graph 100 may represent a collapsed view of a portion of the service model graph 100 containing multiple components or sub-nodes that are collapsed into a single node for ease of use and display of the service model graph 100.

The nodes of the full-sized view of the service model graph 100 may be collapsed into nodes that represent multi-sub-node portions of the service model graph 100, in a form that may be expanded as desired by a user of the service model graph 100. But the use of collapsed nodes may present usability issues. A collapsed node provides no visible information about the size or complexity of the branches collapsed into it, and a user typically must manually open the sub-branches one level at a time. If there is a large set of sub-nodes this can take many actions across many scrolling pages of the full-sized view, and expanding the sub-node may explode the graph in unexpected ways.

Figure 2:
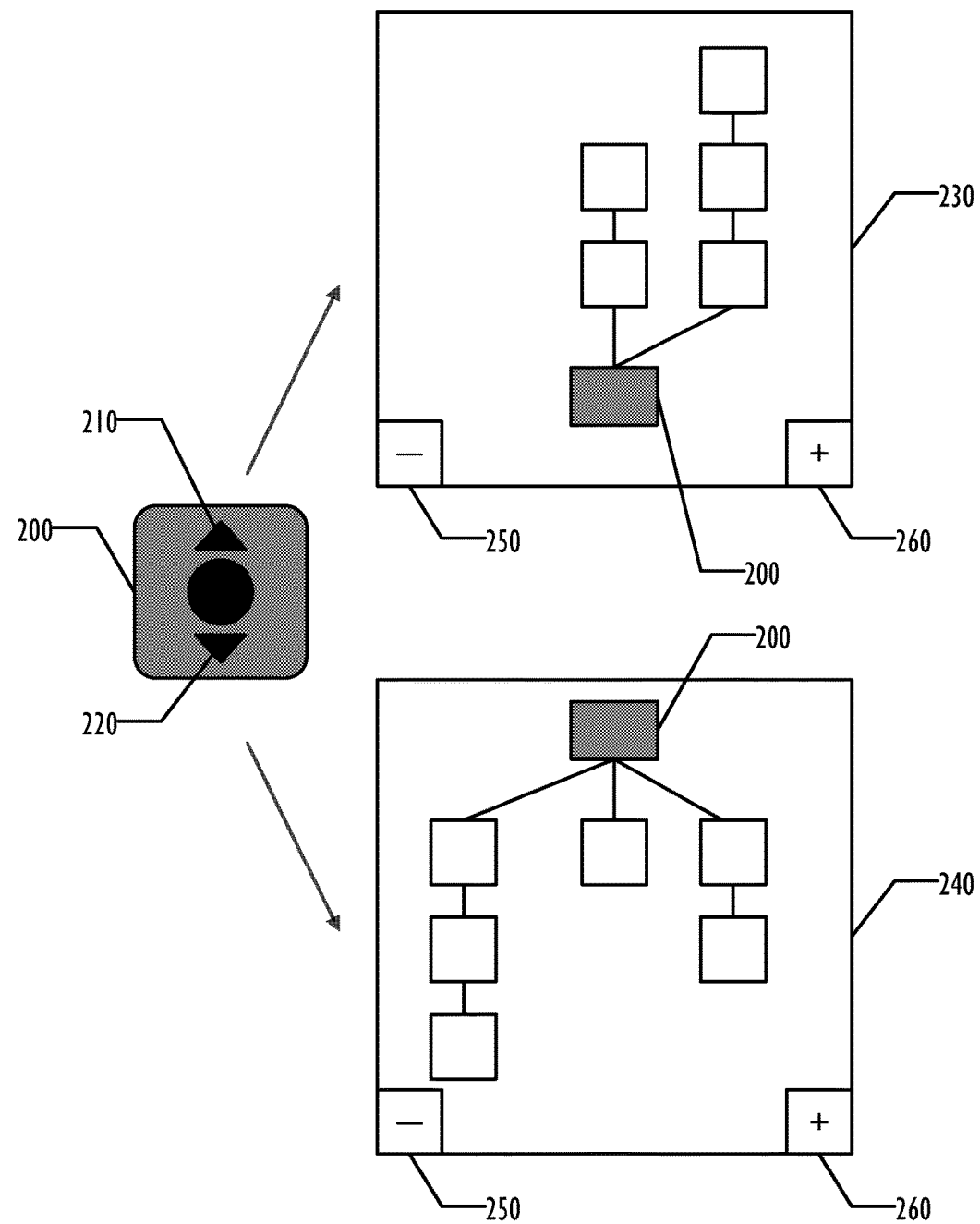
FIG. 2 illustrates, in block diagram form, an embodiment of a graphical mini-view according to one embodiment.

FIG. 2 is a block diagram illustrating a technique for providing a graphical mini-view according to one embodiment. Node 200 is an example of a collapsed node of a full-sized view of a service model graph, where multiple sub-nodes of the service model graph have been collapsed into the node 200. For clarity, only node 200 is illustrated in FIG. 2, and the remainder of the view of the service model graph is omitted. Node 200 is represented by an icon that includes elements 210 and 220, in FIG. 2 illustrated as triangles or arrows pointing up and down relative to the node 200.

Elements 210 and 220 may be implemented as mouseover targets. Although represented in FIG. 2 as triangles or arrows, the mouseover targets may be any type of mouseover target areas or features on graphical display that may be activated when software detects that a user has moved a pointer or cursor over the mouseover area. Although the mouseover area typically includes a graphical element that encourages a user to position the pointer over the mouseover target area, in some embodiments, mouseover target areas may be used with no visible element.

In this embodiment, each node in the full-sized view of the service model graph has one or more mouseover target areas, depending upon the connectivity of the node represented in collapsed form to other nodes in the graph that have been collapsed into the collapsed node. For example, if the collapsed node represents one or more sub-nodes that would be displayed below the collapsed node on the graph when expanded, then a mouseover target area may be placed on the collapsed node in a lower portion of the collapsed node's visual display. Similarly, if the collapsed node represents one or more sub-nodes that would be displayed above the collapsed node on the graph when expanded, then a mouseover target area may be placed on the collapsed node in a upper portion of the collapsed node's visual display. A collapsed node that represents one or more sub-nodes that would be displayed above the collapsed node and below the collapsed node on the graph when expanded may have both an upper and lower mouseover target area placed on the collapsed node.

When the software detects that a user has positioned a cursor, such as a mouse pointer, substantially coincident with one of the mouseover target areas, a mini-view of at least some of the nodes collapsed into the collapsed node may be displayed. As illustrated in FIG. 2, positioning a cursor over the upper mouseover target area 210 may result in a mini-view 230, concisely representing some or all of the nodes rooted to node 200 that would be displayed in the service model graph (typically above the node 200 in the full-sized view) if the collapsed node 200 were expanded. Similarly, positioning a cursor over the lower mouseover target area 220 may result in a mini-view 240, concisely representing some or all of the nodes rooted from the node 200 that would be displayed in the service model graph (typically below the node 200 in the full-sized view) if the collapsed node 200 were expanded.

In the example mini-views 230 and 240 illustrated in FIG. 2, the collapsed node 200 is visible in the mini-view and is identified in FIG. 2 using the same visual characteristics as the collapsed node 200 to help identify the collapsed node 200 in the mini-view 230 or 240.

Mini-views 230 and 240 allow users to see a preview of the other nodes related to the node 200. The mini-views 230 and 240 may be displayed on top of the existing display of the service model graph.

In one embodiment, presentation of the mini-view automatically positions the cursor within the mini-view. When software detects that the user has moved the cursor away from mouseover target area 210 or 220, then mini-views 230 or 240 may automatically disappear or be removed from the display. Although described herein as mouseover targets, the techniques disclosed herein are compatible with all conventional graphical user interface (GUI) object selection techniques, such as single click, double-click, gestures, etc. In embodiments in which an object selection technique such as single click is used, a first object selection may cause the display of the mini-view and a second object selection may cause the mini-view to disappear.

Mini-views such as the example in FIG. 2 are unlike scrolling windows that have been used solely for scrolling purposes. A scrolling window is for scrolling around a view and does not provide for expansion and contraction or collapse of nodes in a graph view. Furthermore, unlike a scrolling window, the disclosed mini-views are associated with a selected object, not an entire graph or regional graph view, advantageously focusing the user just on the related nodes of current interest to the user. In addition, scrolling windows typically only allow scrolling around the current view of a graph, and do not allow display in the mini-view of objects that are currently hidden in the full-sized view, while the disclosed mini-views show objects that are related to the selected node, regardless of their visibility in the full-sized graph.

Disclosed embodiments of mini-views also provide capability unlike that found in magnifiers, which merely enlarge the visible view of a portion of the display. Various disclosed embodiments provide for interactions with the mini-view to perform actions on the nodes displayed in the mini-view, as described in more detail below.

Figure 3:
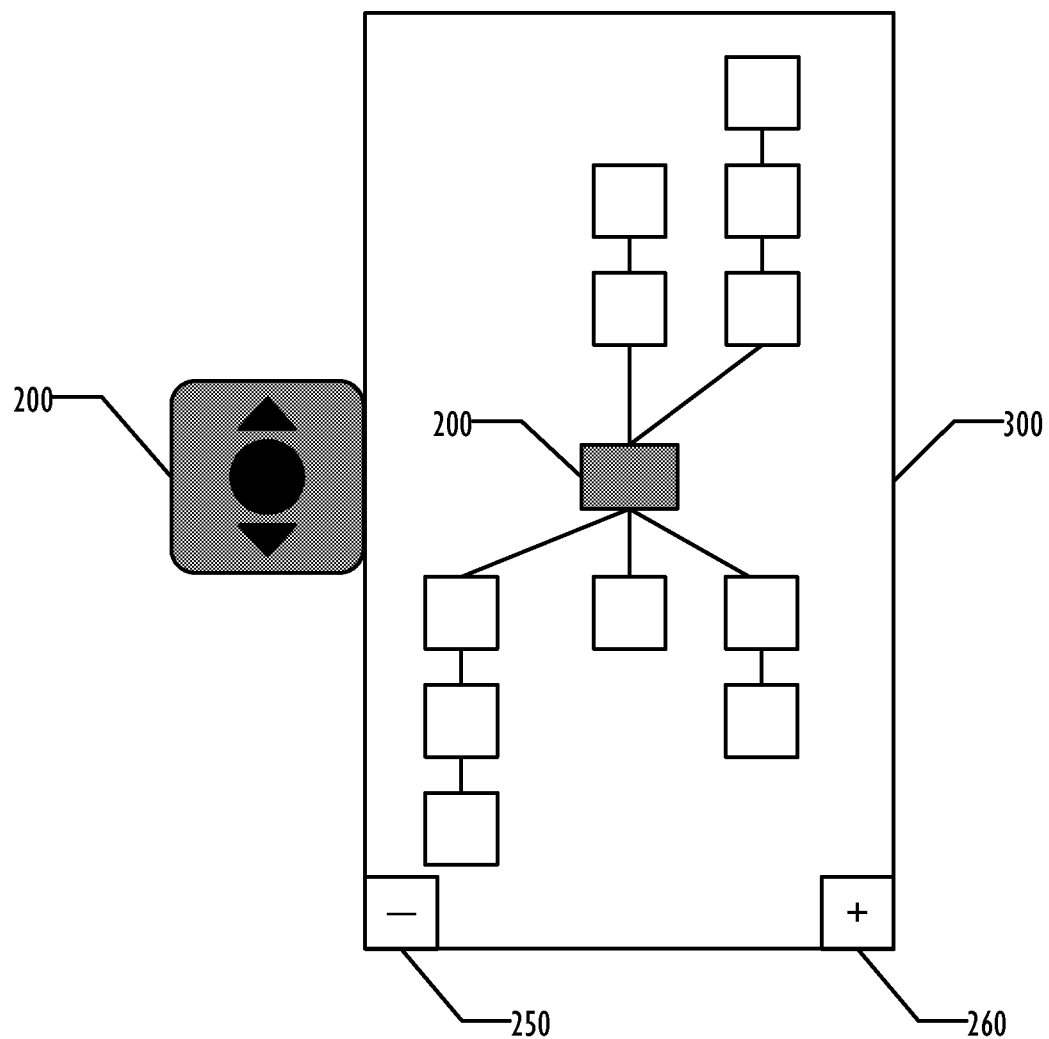
FIG. 3 illustrates, in block diagram form, an embodiment of a graphical mini-view according to one embodiment.

FIG. 3 illustrates an embodiment in which moving the cursor over either of the mouseover target areas 210 or 220 results in a mini-view 300 that displays a combination of the mini-views 230 and 240, previewing related nodes to node 200 that rooted to or rooted from 200 in the full-size graph. In such an embodiment, the mouseover target area of the node 200 may be coextensive with the visual display of the collapsed node 200, so that positioning the cursor anywhere over the node 200 may cause the generation of the mini-view 300, instead of the separate upper and lower mouseover target areas illustrated in FIG. 2 and FIG. 3.

In one embodiment, the mouseover behavior may be optionally configured to behave as illustrated in either FIG. 2 or FIG. 3.

The related nodes made visible in the mini-view may be represented in a variety of representational ways with a variety of information about each node in the mini-view, as discussed in more detail below.

In one embodiment, the mini-view may be interactive. For example, users may select in the mini-view which related nodes they want to open or collapse within the full-sized view, using any standard GUI object selection technique known to the art. In one embodiment, the mini-view window or frame may be limited to a size insufficient to display all of the related nodes. In such an embodiment, the mini-view contents may be scrollable using any conventional scrolling technique known to the art.

In one embodiment, selecting a single node in the mini-view expands the branch of the full-size service model graph from the node 200 all the way out to the child node that was selected. In one embodiment, multiple nodes may be selected using any conventional multi-selection technique, allowing expanding multiple branches of the graph related to the node 200 with a single action. As illustrated in FIGS. 2 and 3, the mini-views 230, 240, and 300 may contain selection areas 250 and 260 that can be used to expand or collapse in the full-size graph all nodes shown in the mini-view.

In one embodiment, the node 200 may be any node of the service model graph, regardless of whether the node 200 is a collapsed node. The mini-view may then show nodes related to the node 200, regardless of whether those nodes are visible in the service model graph, allowing a convenient way to collapse or expand multiple nodes graphically related to the node 200.

In one embodiment, an option may control the number of levels of the service model graph that may be displayed in the mini-view. For example, in one embodiment, by default up to three levels of the graph may be displayed in the mini-views 230, 240, or 300, but a user may optionally select any desired number of levels for display in the mini-view.

In one embodiment, an option may control the screen display size of the mini-view using any technique for controlling the size of a frame or window. The mini-view may be automatically sized by default to fit the contents that are to be displayed in the mini-view. A user may also have the ability to interactively resize or move the mini-view window on the display using conventional window movement and resizing techniques.

As discussed above, in one embodiment, an option may control whether mouseover on an mouseover target opens just branches corresponding to that specific target (210 or 220) or for both targets 210 and 220. In one embodiment, the behavior on mouseover may vary depending on whether any branches are open related to the node 200. For example, if the node 200 is completely closed, with no branches in the service model graph connecting the node 200 to any other node, then a mouseover of either mouseover target may act as a mouseover event for both mouseover targets 210 and 220. If the node 200 has been expanded to display branches above or below the node 200, then a mouseover of a mouseover target corresponding to already open branches may have no effect, but a mouseover of a mouseover target corresponding to a side with no open branches may open a mini-view to display the branches that might be opened on that side of the node 200.

In some embodiments, the mouseover targets may be defined to correspond to selection targets of the node 200, so that a mouseover of the target produces a mini-view that corresponds to a portion of the service model graph that might be opened by a selection of the same target by a single click or other technique.

Figure 4:
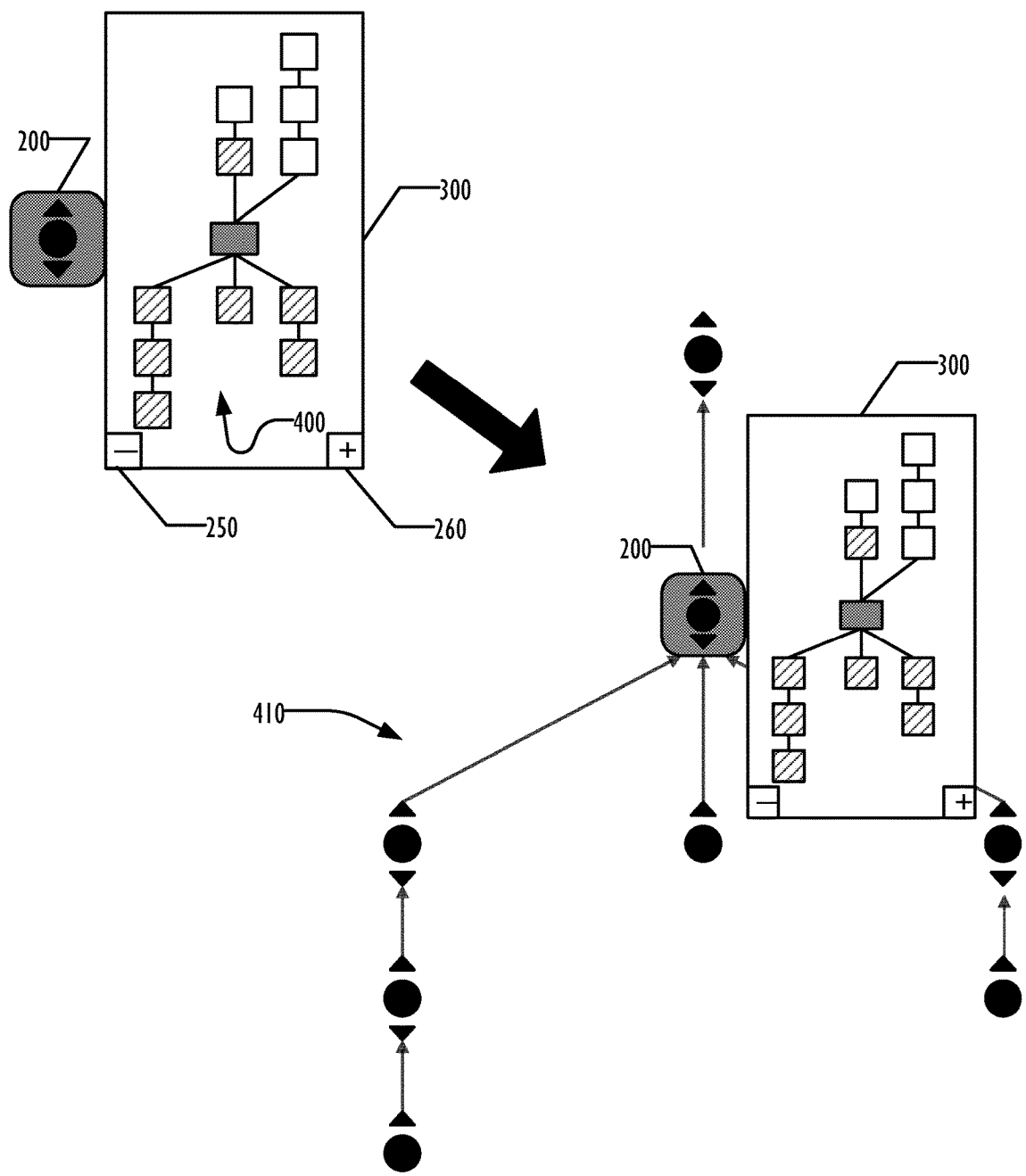
FIG. 4 illustrates, in block diagram form, an embodiment of a graphical mini-view according to one embodiment, illustrating interactivity with the mini-view.

FIG. 4 illustrates an interaction with a mini-view 300 according to one embodiment. In this embodiment, a user may select one or more nodes displayed in the mini-view 300 to expand in the full-sized service model display. Thus, the nodes 400 selected by the user in the mini-view 300, as indicated by the shading, are expanded as nodes 410 in the full size graph of which node 200 is a part. This allows the user to display the mini-view 300 and then to choose which parts of the collapsed node 200 the user wishes to see in greater detail in the full-sized service model display, without having to expand separately each branch connected to the collapsed node 200. Alternately, the user may select either the "collapse all" selection area 250 or the "expand all" selection area 260 to collapse or expand all of the nodes displayed in the mini-view 300 in a single interaction.

Figure 5:
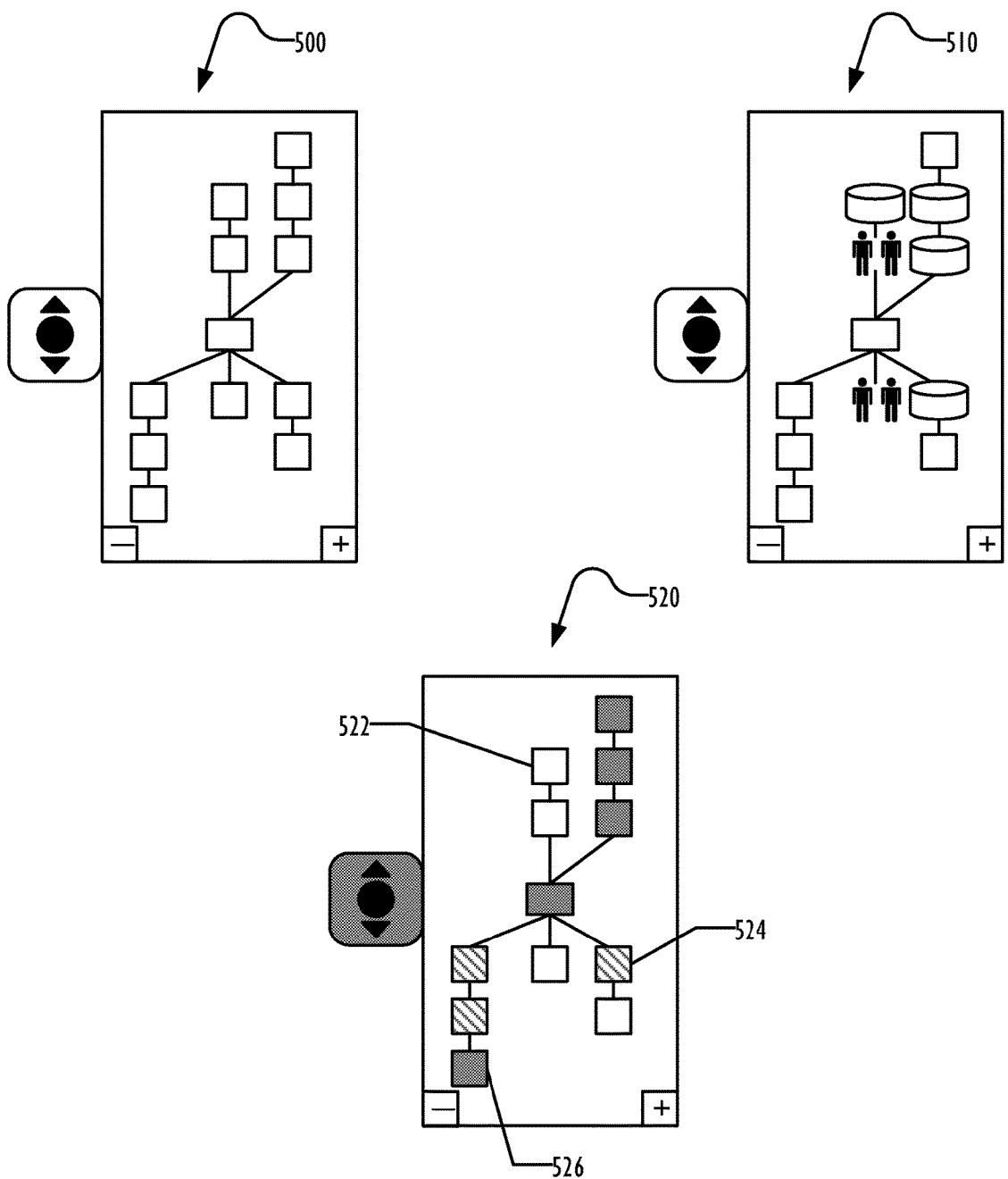
FIG. 5 illustrates, in block diagram form, an example of three alternative embodiments of a mini-view.

FIG. 5 illustrates three alternate embodiments of techniques for displaying the nodes in the mini-views. In mini-view 500, the nodes are displayed as simple blocks. In mini-view 510, the nodes may be represented by icons based on their corresponding object type. In mini-view 520, the nodes may be colored corresponding to the status of the corresponding element in the service model. These display techniques are illustrative and by way of example only and other display techniques may be used, including combinations, such as representing nodes by object type icons that are colored according to the element's status. In one embodiment, the node corresponding to node 200 may be identified in the mini-views 500, 510, or 520 by highlighting, shading, coloring, or any other convenient or desired technique for differentiating one node in a graph.

Mini-views such as illustrated in FIGS. 2-5 may be interactive, with the mouseover targets available in the mini-view that may respond to mouseover events with additional windows or frames that may contain additional information about the node or nodes related to the mouseover events. For example, in one embodiment, positioning a mouse pointer over one of the nodes in the mini-view may generate a window that provides detailed information about the corresponding mini-view node.

Figure 6:
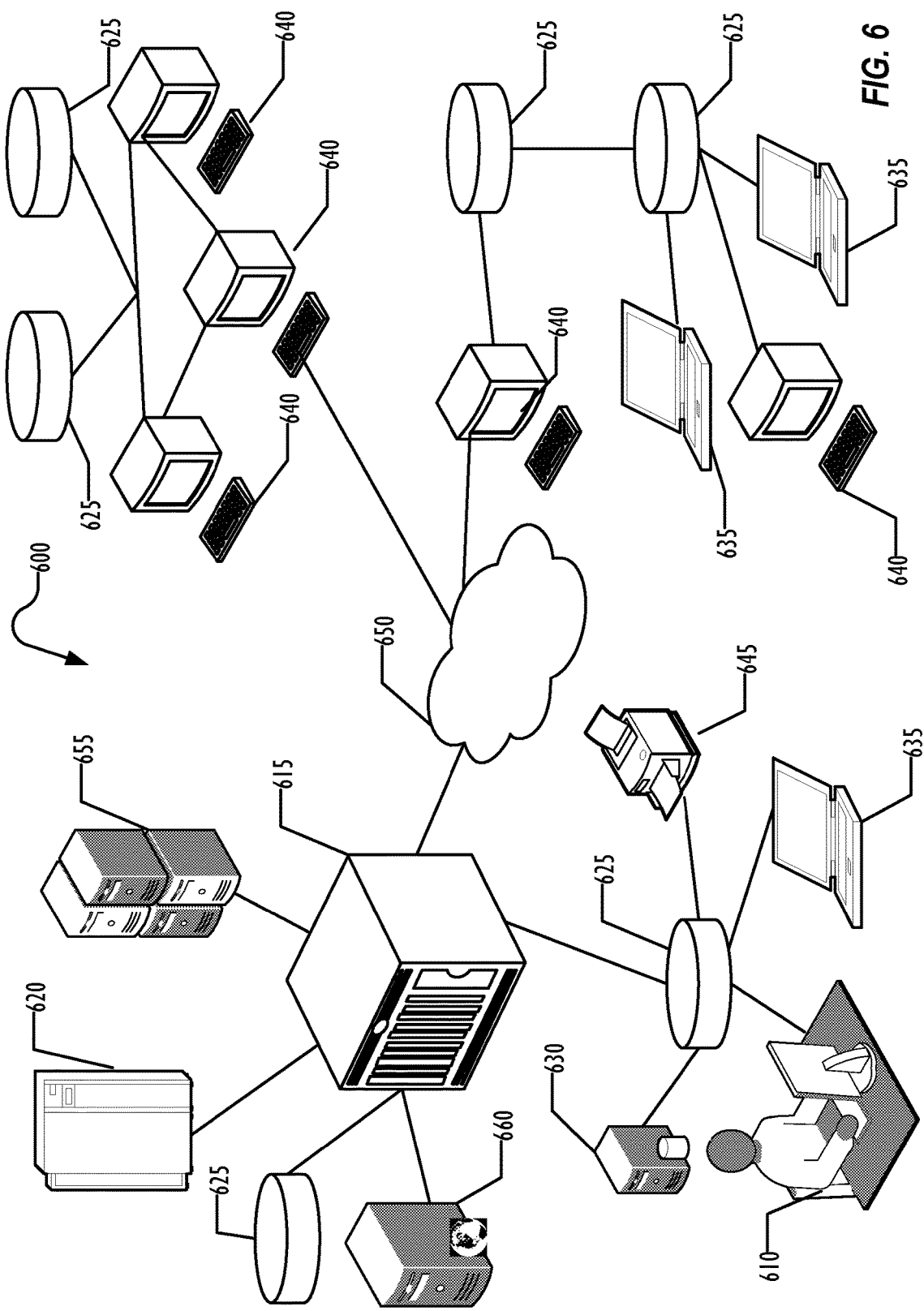
FIG. 6 illustrates, in block diagram form, a network of computing devices according to one embodiment of a system incorporating graphical mini-views.

FIG. 6 is a block diagram illustrating an IT infrastructure 600 that may include elements that provide access to service model graphs that incorporate mini-view as disclosed above. A user 610 may use a terminal or workstation to access service model graph software to display a service model graph such as illustrated in FIG. 1 on a display associated with the workstation. The software generating the graphical display of the service model graph on the user 610 workstation display, including the mini-views, may execute on the workstation for the user 610 or on other computing resources of the IT infrastructure 600, such as a mainframe 620, a web server 660, a database server 630, an application server 655, and other workstations 640, laptops 635. The IT infrastructure 600 may include one or more databases 625 that store data related to the service model graph corresponding to the organizational elements, services, IT hardware, and IT software that is modeled by the service model. The IT infrastructure may further include other IT resources, such as a printer 645. The IT infrastructure may be connected in any way known to the art, including using switches or routers 615 and networks 650.

Figure 7:
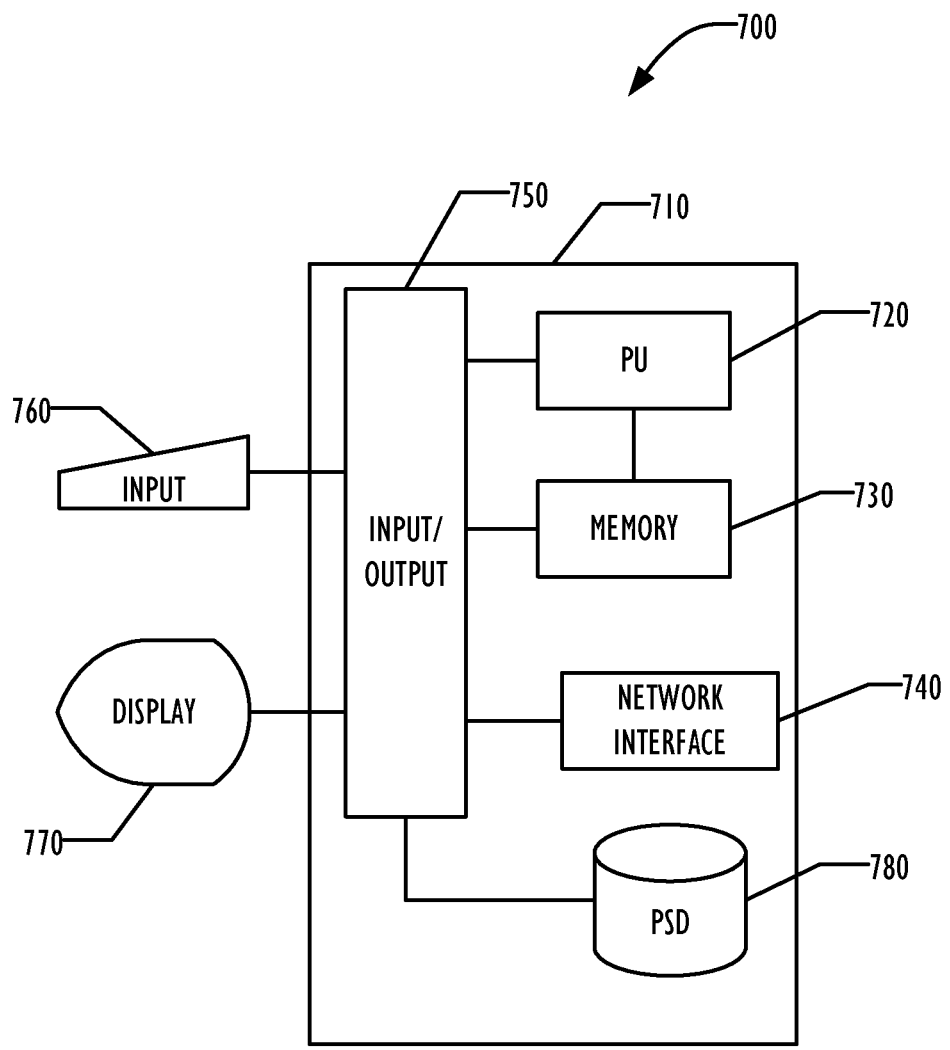
FIG. 7 illustrates, in block diagram form, a computing device for generating and displaying graphical mini-views according to one embodiment.

Referring now to FIG. 7, an example computer 700 for use in providing a mini-view display is illustrated in block diagram form. Example computer 700 comprises a system unit 710 which may be optionally connected to an input device or system 760 (e.g., keyboard, mouse, touch screen, etc.) and display 770. A program storage device (PSD) 780 (sometimes referred to as a hard disc) is included with the system unit 710. Also included with system unit 710 is a network interface 740 for communication via a network with other computing and corporate infrastructure devices such as are shown in FIG. 6. Network interface 740 may be included within system unit 710 or be external to system unit 710. In either case, system unit 710 will be communicatively coupled to network interface 740. Program storage device 780 represents any form of non-volatile storage including, but not limited to, all forms of optical and magnetic, including solid-state, storage elements, including removable media, and may be included within system unit 710 or be external to system unit 710. Program storage device 780 may be used for storage of software to control system unit 710, data for use by the computer 700, or both.

System unit 710 may be programmed to perform methods in accordance with this disclosure. System unit 710 comprises a processor unit (PU) 720, input-output (I/O) interface 750 and memory 730. Processing unit 720 may include any programmable controller device including, for example, one or more members of the Intel Atom®, Core®, Pentium® and Celeron® processor families from Intel Corporation and the Cortex and ARM processor families from ARM. (INTEL, INTEL ATOM, CORE, PENTIUM, and CELERON are registered trademarks of the Intel Corporation. CORTEX is a registered trademark of the ARM Limited Corporation. ARM is a registered trademark of the ARM Limited Company.) Memory 730 may include one or more memory modules and comprise random access memory (RAM), read only memory (ROM), programmable read only memory (PROM), programmable read-write memory, and solid-state memory. One of ordinary skill in the art will also recognize that PU 720 may also include some internal memory including, for example, cache memory.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method, comprising:
    displaying, in a first window, a first portion of a plurality of nodes in a graph, each of the nodes in the graph representing either a single component of a graph model or representing multiple components of the graph model, wherein at least some nodes in the first portion that represent multiple components have a respective representation that includes a respective target area;
    determining that a cursor is positioned substantially coincident with a first respective target area associated with a first node of the first portion of the plurality of nodes, the first node representing a second portion of the plurality of nodes and a third portion of the plurality of nodes, the nodes in the second portion and the nodes in the third portion being absent from the first window, the nodes in the second portion being nodes rooted to the first node in the graph and the nodes in the third portion being nodes rooted from the first node in the graph, the nodes in the second portion being disjoint from the nodes in the third portion; and
    responsive to determining that the cursor is positioned substantially coincident with the first respective target area, displaying in a second window the first node coupled with at least some of the nodes in the second portion and coupled with at least some of the nodes in the third portion.

2. The method of claim 1, further comprising: removing the second window responsive to determining that the cursor is no longer positioned substantially coincident with the first respective target area.

3. The method of claim 1, further comprising:
    detecting a selection of a second node in the second portion of the plurality of nodes; and
    displaying the second node connected to the first node in the first window,
    wherein nodes in the second portion that are not in a branch defined by the second node and the first node remain absent from the first window.

4. The method of claim 3, wherein, in the second window, respective representations of the nodes in the second portion that are not included in the branch differ visually from respective representations of the nodes in the second portion that are in the branch.

5. The method of claim 1, wherein the second window is scrollable.

6. The method of claim 1, wherein the second window includes a selection area and the method further comprises:
    receiving a selection of the selection area; and
    displaying in the first window the nodes in the second portion and the nodes in the third portion.

7. The method of claim 1, wherein each of the nodes in the first portion has a respective target area and the method further comprises:

determining that the cursor is positioned substantially coincident with a second respective target area associated with a second node in the first portion, the second node representing a single component of the graph model; and displaying in a third window, responsive to determining that the cursor is positioned substantially coincident with the second respective target area, the second node coupled with nodes in a fourth portion of the plurality of nodes and coupled with nodes in a fifth portion of the plurality of nodes, the nodes in the fourth portion rooting to the second node in the graph and the nodes in the fifth portion rooting from the second node in the graph.

8. The method of claim 7, wherein the third window includes a selection area and the method further comprises:

receiving a selection of the selection area; and removing from the first window the nodes in the fourth portion and the nodes in the fifth portion, wherein the second node becomes a node representing multiple components of the graph model.

9. The method of claim 7, wherein the nodes in the fourth portion represent nodes rooting to the second node up to a predetermined level and the nodes in the fifth portion represent nodes rooting from the second node up to the predetermined level.

10. A system comprising:

a processor;

a display, coupled to the processor;

a user input device, coupled to the processor;

a storage subsystem, coupled to the processor; and software stored on the storage subsystem that, when executed, causes the system to:

display, in a first window, a first portion of a plurality of nodes in a graph, each of the nodes in the graph representing either a single component of a graph model or representing multiple components of the graph model, wherein each of the nodes in the first portion representing multiple components has a respective representation that includes a respective target area, determine that a cursor is positioned substantially coincident with a first respective target area associated with a first node in the first portion, the first node representing a second portion of the plurality of nodes and a third portion of the plurality of nodes, the nodes in the second portion and the nodes in the third portion being absent from the first window, the nodes in the second portion being nodes rooted to the first node in the graph and the nodes in the third portion being rooted from the first node in the graph, the nodes in the second portion being disjoint from the nodes in the third portion, and responsive to determining that the cursor is positioned substantially coincident with the first respective target area, display in a second window the first node coupled with at least some of the nodes in the second portion and coupled with at least some of the nodes in the third portion.

11. The system of claim 10, the software further causes the system to:

remove the second window responsive to determining that the cursor is no longer positioned substantially coincident with the first respective target area.

12. The system of claim 10, the software further causes the system to:

detect a selection of a second node in the second portion of the plurality of nodes; and display the second node connected to the first node in the first window, wherein nodes in the second portion not in a branch defined by the second node and the first node remain absent from the first window.

13. The system of claim 12, wherein, in the second window, respective representations of the nodes in the second portion that are not in the branch differ visually from respective representations of the nodes the second portion that are in the branch.

14. The system of claim 10, wherein the second window is scrollable.

15. The system of claim 10, wherein the second window includes an expand all selection area and the software further causes the system to:

receive a selection of the expand all selection area; and display in the first window the nodes in the second portion and the nodes in the third portion.

16. The system of claim 10, wherein each of the nodes in the first portion has a respective target area and the software further causes the system to:

determine that the cursor is positioned substantially coincident with a second respective target area associated with a second node in the first portion, the second node representing a single component of the graph model; and display in a third window, responsive to determining that the cursor is positioned substantially coincident with the second respective target area, the second node coupled with nodes in a fourth portion of the plurality of nodes and with nodes in a fifth portion of the plurality of nodes, the nodes in the fourth portion rooting to the second node in the graph and the nodes in the fifth portion rooting from the second node in the graph.

17. The system of claim 16, wherein the third window includes a selection area and the software further causes the system to:

receive a selection of the selection area; and remove from the first window the nodes in the fourth portion and the nodes in the fifth portion, wherein the second node becomes a node representing multiple components of the graph model.

18. The system of claim 16, wherein the nodes in the fourth portion represent nodes rooting to the second node up to a predetermined level and the nodes in the fifth portion represent nodes rooting from the second node up to the predetermined level.

19. The system of claim 10, wherein a frame size of the second window is sized to display each of the nodes in the second portion and each of the nodes in the third portion.

20. A system comprising:

a processor;

a display, coupled to the processor;

a user input device, coupled to the processor;

a storage subsystem, coupled to the processor; and software stored on the storage subsystem that, when executed, causes the system to:

display, in a first window, of a plurality of nodes in a graph, each of the nodes in the graph representing either a single component of a graph model or representing multiple components of the graph model, wherein each of the nodes in the first portion has a respective representation that includes a respective target area, determine that a cursor is positioned substantially coincident with a first respective target area associated with a first node in the first portion, the first node representing a single component of the graph model, display in a second window, responsive to determining that the cursor is positioned substantially coincident with the target area, the first node coupled with nodes in a second portion of the plurality of nodes and with nodes in a third portion of the plurality of nodes, the nodes in the second portion rooting to the first node in the graph and the nodes in the third portion rooting from the first node in the graph, the second window having a collapse all selection element, receive a selection of the collapse all selection element, and responsive to receiving the selection:
    collapse, into a collapsed node displayed in the first window, the nodes in the second portion, the first node, and the nodes in the third portion, the collapsed node representing multiple components of the graph model.

21. The system of claim 20, wherein the number of nodes in the second portion and the number of nodes in the third portion are limited by an option specifying a maximum number of levels.

* * * * *

UNITED STATES PATENT AND TRADEMARK OFFICE
CERTIFICATE OF CORRECTION

PATENT NO. : 10,475,218 B2  
APPLICATION NO. : 15/650212  
DATED : November 12, 2019  
INVENTOR(S) : Poston Page 1 of 1

It is certified that error appears in the above-identified patent and that said Letters Patent is hereby corrected as shown below:

In the Claims

In Column 10, Claim 20, Line 61, delete "of" and insert --a first portion of--, therefor.

Signed and Sealed this  
Twenty-first Day of January, 2020

Andrei Iancu  
*Director of the United States Patent and Trademark Office*